United States Patent
Katan et al.

(10) Patent No.: US 11,218,411 B2
(45) Date of Patent: Jan. 4, 2022

(54) FLOW MONITORING IN NETWORK DEVICES

(71) Applicant: Marvell Israel (M.I.S.L) Ltd., Yokneam (IL)

(72) Inventors: Yosef Katan, Ramat HaSharon (IL); Rami Zemach, Givat Shapira (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 94 days.

(21) Appl. No.: 16/829,939

(22) Filed: Mar. 25, 2020

(65) Prior Publication Data

US 2021/0160184 A1    May 27, 2021

Related U.S. Application Data

(60) Provisional application No. 62/938,836, filed on Nov. 21, 2019.

(51) Int. Cl.
| | |
|---|---|
| *H04L 12/803* | (2013.01) |
| *H04L 12/721* | (2013.01) |
| *H04L 12/743* | (2013.01) |
| *G06F 12/0897* | (2016.01) |
| *G06F 12/08* | (2016.01) |
| *G06F 12/0811* | (2016.01) |
| *G06F 12/02* | (2006.01) |

(52) U.S. Cl.
CPC ........ *H04L 47/125* (2013.01); *G06F 12/0238* (2013.01); *G06F 12/08* (2013.01); *G06F 12/0811* (2013.01); *G06F 12/0897* (2013.01); *H04L 45/38* (2013.01); *G06F 2212/70* (2013.01); *G06F 2212/702* (2013.01); *H04L 45/7457* (2013.01)

(58) Field of Classification Search
CPC ... H04L 47/125; H04L 45/38; H04L 45/7457; H04L 47/50; H04L 47/2483; H04L 45/74; G06F 12/0238
See application file for complete search history.

(56) References Cited

U.S. PATENT DOCUMENTS

| | | |
|---|---|---|
| 5,559,801 A | 9/1996 | Lo |
| 6,473,400 B1 | 10/2002 | Manning |
| 6,873,600 B1 | 3/2005 | Duffield et al. |
| 6,970,462 B1 | 11/2005 | McRae |
| 7,092,360 B2 | 8/2006 | Saint-Hilaire et al. |
| 7,215,637 B1 | 5/2007 | Ferguson et al. |

(Continued)

*Primary Examiner* — Mohamed A Kamara

(57) ABSTRACT

Flow state information that is stored in a first memory among a plurality of memories for maintaining flow state information at a network device is updated based on packets ingressing the network device. The memories are arranged in a hierarchical arrangement in which memories at progressively higher levels of hierarchy are configured to maintain flow state information corresponding to progressively larger sets of flows processed by the network device. When it is determined that a fullness level of the first memory exceeds a first threshold, flow state information associated with at least one flow, among a first set of flows for which flow state information is currently being maintained in the first memory, is transferred from the first memory to a second memory, the second memory being at a higher hierarchical level than the first memory. A new flow is instantiated in space freed up in the first memory.

20 Claims, 4 Drawing Sheets

(56) References Cited

U.S. PATENT DOCUMENTS

| | | |
|---|---|---|
| 7,227,842 B1 | 6/2007 | Ji et al. |
| 7,359,968 B1 | 4/2008 | Ng et al. |
| 7,386,699 B1 | 6/2008 | Bishara |
| 7,424,019 B1 | 9/2008 | Kopelman et al. |
| 7,644,157 B2 | 1/2010 | Shomura et al. |
| 7,684,320 B1 | 3/2010 | Nucci |
| 7,688,727 B1 | 3/2010 | Ferguson et al. |
| 8,582,428 B1 | 11/2013 | Bishara et al. |
| 10,243,865 B2 | 3/2019 | Izenberg et al. |
| 2003/0223424 A1 | 12/2003 | Anderson et al. |
| 2004/0148382 A1 | 7/2004 | Narad et al. |
| 2005/0276230 A1 | 12/2005 | Akahane et al. |
| 2006/0048228 A1 | 3/2006 | Takemori et al. |
| 2006/0123467 A1 | 6/2006 | Kumar et al. |
| 2007/0061433 A1 | 3/2007 | Reynolds et al. |
| 2007/0070907 A1 | 3/2007 | Kumar et al. |
| 2007/0076606 A1 | 4/2007 | Olesinski et al. |
| 2007/0201379 A1 | 8/2007 | Kondapalli |
| 2007/0223388 A1 | 9/2007 | Arad et al. |
| 2007/0268922 A1 | 11/2007 | Dougan et al. |
| 2008/0212586 A1 | 9/2008 | Wang et al. |
| 2008/0225853 A1 | 9/2008 | Melman et al. |
| 2008/0240113 A1 | 10/2008 | Arad et al. |
| 2010/0124234 A1* | 5/2010 | Post ............... H04L 47/527 370/412 |
| 2015/0281098 A1 | 10/2015 | Pettit et al. |
| 2017/0142034 A1* | 5/2017 | K ..................... H04L 1/188 |
| 2018/0131602 A1 | 5/2018 | Civanlar et al. |
| 2019/0268272 A1 | 8/2019 | Mizrahi et al. |

\* cited by examiner

FLOW MONITORING IN NETWORK DEVICES

CROSS REFERENCES TO RELATED APPLICATIONS

This application claims the benefit of U.S. Provisional Patent App. No. 62/938,836, entitled "Flow Analysis and Management," filed on Nov. 21, 2019, the disclosures of which is hereby expressly incorporated herein by reference in its entirety.

FIELD OF TECHNOLOGY

The present disclosure relates generally to communication networks, and more particularly to flow information collection and management in a network device.

BACKGROUND

It is often useful to obtain traffic flow measurements in a communication network. For example, such information regarding flows may be used to characterize flows using parameters such as flow duration, volume, time, burstiness, etc. Traffic flow measurements may be made by a network device such as a bridge, switch, or router, for example, or some other measurement device. Then, these measurements may be utilized for various processes such as traffic metering, traffic profiling, traffic engineering, an attack/intrusion detection, accounting, QoS validation, etc. For example, a traffic profiling application may utilize flow measurements taken at multiple different nodes (e.g., routers, bridges, switches, etc.) in a network so as to analyze traffic in different portions of the network.

Conventional network devices update flow state information maintained in a flow state information memory that supports updates at wire speed. The network device periodically transmits the flow state information stored in the flow state information memory to a collector device that generally collects such information from multiple network device in a network. The flow state information is typically exported from the network device to the collector device periodically, for example according to a schedule defined by a flow monitoring protocol utilized by the network device. Once the flow state information stored in the flow state information memory of the network device is exported to the collector device, freed up space in the flow state information memory is available for maintaining flow state information for new flows processed by the network device. The flow state information memory in the network device typically needs to be both fast enough to allow flow state information to be updated at wire speed and large enough to maintain flow state information for a sufficient number of flows that may be processed by the network device in a time interval between the periodic of exports of flow state information to the collector device.

SUMMARY

In an embodiment, a method for monitoring flows in a network device includes: receiving, at a packet processor of the network device, packets ingressing via a plurality of network interfaces of the network device; classifying, with the packet processor based at least in part on information in respective headers of the packets, the packets into respective flows; updating, with the packet processor based on the received packets, flow state information associated with the respective flows corresponding to the received packets, the flow state information stored in a first memory among a plurality of memories for maintaining flow state information at the network device, the plurality of memories arranged in a hierarchical arrangement in which memories at progressively higher levels of hierarchy are configured to maintain flow state information corresponding to progressively larger sets of flows processed by the network device, the first memory being at a first hierarchical level of the hierarchical arrangement; and dynamically managing, with the packet processor, the plurality of memories, including: determining, with the packet processor, that a fullness level of the first memory exceeds a first threshold, in response to determining that the fullness level of the first memory exceeds the first threshold, transferring flow state information associated with at least one flow, among a first set of flows for which flow state information is currently being maintained in the first memory, from the first memory to a second memory among the plurality of memories, the second memory being at a second hierarchical level that is higher than the first hierarchical level of the hierarchical arrangement, to free up space to in the first memory, and after transferring flow state information associated with the at least one flow from the first memory to the second memory, instantiating, with the packet processor, a new flow in the space freed up in the first memory.

In another embodiment, a network device comprises a plurality of network interfaces, and a packet processor coupled to the plurality of network interfaces. The packet processor is configured to: receive packets ingressing via a plurality of network interfaces of the network device, classify, based at least in part on information in respective headers of received packets, the packets into respective flows, update, based on the received packets, flow state information associated with the respective flows corresponding to the received packets, the flow state information stored in a first memory among a plurality of memories for maintaining flow state information at the network device, the plurality of memories arranged in a hierarchical arrangement in which memories at progressively higher levels of hierarchy are configured to maintain flow state information corresponding to progressively larger sets of flows processed by the network device, the first memory being at a first hierarchical level of the hierarchical arrangement, and dynamically mange the plurality of memories, the packet processor being configured to: determine a fullness level of the first memory exceeds a first threshold, in response to determining that the fullness level of the first memory exceeds the first threshold, transfer flow state information associated with at least one flow, among a first set of flows for which flow state information is currently being maintained in the first memory, from the first memory to a second memory among the plurality of memories, the second memory being at a second hierarchical level that is higher than the first hierarchical level of the hierarchical arrangement, to free up space to in the first memory, and after transferring flow state information associated with the at least one flow from the first memory to the second memory, instantiate a new flow in the space freed up in the first memory.

DETAILED DESCRIPTION

In embodiments described below, a network device utilizes several hierarchical levels of memory for maintaining flow state information corresponding to flows processed by the network device. Memories at progressively increasing hierarchical levels are progressively larger, slower, and less expensive, in an embodiment. Memories at progressively increasing hierarchical levels are configured to maintain progressively larger sets of newest and most active flows being processed by the network device at any given time, in an embodiment. The network device is configured to manage memory space of the memories based on monitoring respective fullness levels of one or more memories at the different hierarchical levels of memories, in an embodiment. When a memory at a lower level of the hierarchy is at or near full capacity, the network device transfers flow state information associated with one or more flows in the memory at the lower level of the hierarchy to a memory at the next level of the hierarchy, in an embodiment. The freed up space in the memory at the lower level of hierarchy is then used to instantiate a newer flow in the memory at the lower level of hierarchy, in an embodiment. Transferring flow state information associated with older flows from memories at relatively lower levels of hierarchy to memories at relatively higher levels of hierarchy allows the network device to be scaled to maintain flow state information for any given number of flows, for example based on a location of the network device in a network, while maintaining flow state information associated with newest and most active flows in faster and more expansive memories at lower levels of hierarchy and without expanding the more expensive memories at the lower levels of hierarchy, in at least some embodiments.

Figure 1:
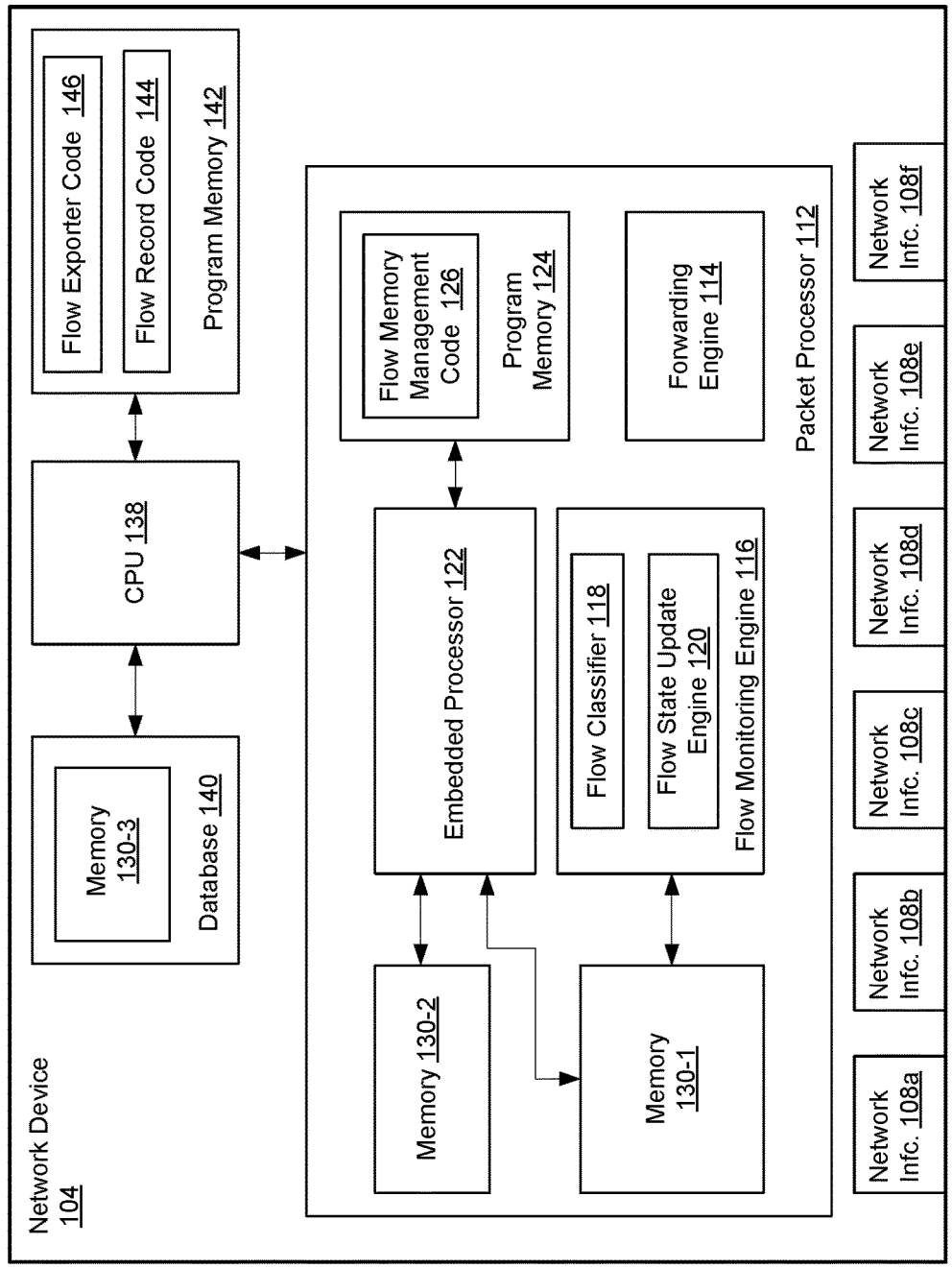
FIG. 1 is a block diagram of an example network device configured for flow monitoring, according to an embodiment.

FIG. 1 is a block diagram of an example network device 100, such as a bridge, switch, router, etc., that includes capabilities for flow monitoring, according to an embodiment. The network device 100 includes a plurality of network interfaces 108 (sometimes referred to herein as "ports") that are configured to couple to network communication links. The network device 100 also includes a packet processor 112 coupled to the plurality of ports 108. In an embodiment, the packet processor 112 is implemented on a single integrated circuit (IC) (sometimes referred to as a "chip"). For example, the packet processor 112 corresponds to a "system on a chip" (SoC) that integrates various components (including an embedded processor 122) of the network device 100 onto the single IC. In another embodiment, the packet processor 112 is implemented on multiple ICs that correspond to a multi-chip module (MCM) in which the multiple ICs are integrated, e.g., onto a unifying substrate, and integrated within a single IC package having IC pins. In an embodiment, the multiple ICs are internally (e.g., within the IC package) connected together by fine wires and/or with conductors embedded in the unifying substrate. In yet another embodiment, the packet processor 108 is implemented on multiple ICs that correspond to a system-in-a-package (SiP). SiPs are generally similar to MCMs, but with SiPs the multiple ICs can be stacked vertically or tiled horizontally within a single IC package.

The packet processor 112 includes a forwarding engine 114 coupled to the plurality of ports 108. The forwarding engine 114 is configured to forward packets between the plurality of ports 108 based on, for example, analyzing information (e.g., one or more of destination addresses, virtual local area network (VLAN) identifiers, etc.) in headers of the packets. The packet processor 112 further includes a flow monitoring engine 116. The flow monitoring engine 116 includes a flow classifier 118 and a flow state update engine 116, in an embodiment. The flow classifier 118 is configured to classify packets into flows, and the packet processor 112 is configured to maintain flow state information regarding the flows. A flow corresponds to related series of packets. As one example, some flows, such as Internet Protocol (IP) transmission control protocol (TCP)/user datagram protocol (UDP) flows, are typically defined in the networking industry by a 5-tuple such as {destination IP address, source IP address, L4 Protocol, UDP/TCP destination port, UDP/TCP source port}. In other examples, flows are merely identified by a particular source address and/or a particular destination address in headers of packets. For instance, all packets having a particular IP source address correspond to a particular flow, or all packets having a particular IP destination address correspond to a particular flow. As yet another example, all packets having both a particular IP source address and a particular IP destination address correspond to a particular flow. Similarly, packets having a particular media access control (MAC) source address and/or a particular MAC destination address correspond to a particular flow. Other information in packet headers additionally or alternatively are used to define a flow, such as one or more of a particular packet type, a particular virtual local area network (VLAN) identifier (ID), etc.

The network device 100 may process different numbers of flows in a given time, depending, for example, on the location of the network device 100 in a network. As just an example, if the network device 100 is utilized as an edge router in the network, the network device 100 may process a relatively larger number of flows in a given time as compared to a network device that is not positioned at an edge of the network. In an embodiment, the network device 100 utilizes a hierarchical arrangement of memories 130, in which a memory 130 at the lowest level in the hierarchy is the fastest, most expensive and smallest in storage capacity, and memories 130 at progressively higher levels in the hierarchy are progressively slower, less expensive and larger in storage capacity. As described in more detail below, the network device 100 is configured to utilize memories at the different levels of the hierarchy, as needed, to scale up to monitoring any suitable number of flows processed in a given time by the network device 100 depending, for example, on the location of the network device 100 in a network.

One or more of the memories 130 are internal to the packet processor 112, in an embodiment. For example, the packet processor 112 includes a first memory 130-1 and a second memory 130-2 that are internal to (e.g., implemented on a same chip as) the packet processor 112, in the illustrated embodiment. Although the packet processor 112 is illustrated in FIG. 1 as including two memories 130 that are internal to the packet processor 112, the packet processor 112 includes other numbers (e.g., 3, 4, 5, etc.) of memories 130 internal to the packet processor 112, in other embodiments. In another embodiment, the packet processor 112 includes only a single memory 130 that is internal to the packet processor 112. The network device 100 also includes at least one memory 130 that is external to the packet processor 112, in an embodiment. For example, the network device 100 includes a third memory 130-3 that is external to the packet processor 112, in an embodiment. The memory 130-3 is implemented on one or more chips that are separate from a chip on which the packet processor 112 is implemented, in an embodiment. The memory 130-3 is coupled to an external processor 138, such as a central processing unit (CPU) of the network device 100, in an embodiment.

In an embodiment, the memories 130 are arranged in a hierarchical arrangement in which the memory 130 at the lowest level in the hierarchy is the fastest (e.g., has the highest memory access bandwidths), most expensive and smallest in storage capacity, and memories at progressively higher levels in the hierarchy are progressively slower, less expensive and larger in storage capacity, in an embodiment. In an embodiment, the memory 130-1 is at a first, lowest, level of hierarchy, the memory 130-2 is at a second level of hierarchy that is the next level with respect to the first level of hierarchy, and the memory 130-3 is at a third, highest, level of hierarchy, in the illustrated embodiment. The memory 130-1 is a ternary content addressable memory (TCAM) or another type of memory that is configured to operate at wire speed, in an embodiment. The memory 130-2 is a memory that is slower, but larger in storage capacity, than the memory 130-1, in an embodiment. The memory 130-2 is a random access memory (RAM) or another suitable type of memory, in various embodiments. Similarly, the memory 130-3 is slower, and larger in storage capacity, than the memory 130-2, in an embodiment. The memory 130-3 is included in a database 140 coupled to the CPU 138 of the network device 100, in an embodiment.

As described in more detail below, the packet processor 112 is configured to manage flow state information in the memories 130 such that the memory 130 at the lowest level of the hierarchy stores flow state information corresponding to a first set of the most recent and/or the most active flows being processed by the packet processor 112, and one or more memories at higher levels of hierarchy are utilized, as needed, to store progressively larger sets of most recent and/or most active flows processed by the packet processor 112. Because the memory 130 at the lowest hierarchy level stores the most active and/or the most recent flows processed by the packet processor 112, the packet processor 112 is able to update flow state information corresponding to the most active and/or most recent flows at wire speed, while scaling up to maintaining flow state information corresponding to larger sets of most active and/or the most recent flows in one or more progressively slower and larger memories 130, as needed, without expanding memories 130 at the lower levels of hierarchy, in an embodiment. Accordingly, the network device 100 is scalable to maintain flow state information corresponding to a suitable maximum number of flows that can be processed by the network device 100, using fewest levels of the hierarchy and without expanding fixed sized memory at lower levels of the hierarchy, in an embodiment.

With continued reference to FIG. 1, the flow monitoring engine 116 generally determines whether an ingressing packet belongs to an existing flow (i.e., a flow that the flow monitoring engine previously identified and of which flow monitoring engine 116 is currently aware) or belongs to a currently unknown flow (sometimes referred to in the present disclosure as a "new flow"). For example, the flow monitoring engine 116 classifies a packet into a flow, and checks whether an entry corresponding to the flow currently exists in the memory 130-1. When the flow monitoring engine 116 determines that an ingressing packet does not belong an existing flow, e.g., when an entry corresponding to the flow currently does not exist in a flow information state table stored in the flow memory 130-1, the flow is instantiated in the memory 130-1, in an embodiment. In an embodiment, instantiating the flow in the memory 130-1 involves associating an entry of a flow information state table for maintaining flow state information in the memory 130-1 with the flow, for example by adding information identifying the flow to a flow identification field in the entry in the memory 130-1. In an embodiment, the flow monitoring engine 116 instantiates the new flow in the flow memory 130-1. In another embodiment, another entity (e.g., the embedded processor 122 or the CPU 138) instantiates the new flow in the flow memory 130. For example, when the flow monitoring engine 116 determines that an ingressing packet does not belong to a known flow, the flow monitoring engine 116 mirrors the packet to the embedded processor 122 or the CPU 138, and the embedded processor 122 or the CPU 138 instantiates the new flow in the memory 130-1.

On the other hand, when the flow monitoring engine 116 determines that an ingressing packet belongs to an existing flow, e.g., when an entry corresponding to the flow currently exists in the memory 130-1, the flow monitoring engine 116 updates flow state information in the (or associated with) the entry corresponding to the flow based on the ingressing packet, according to an embodiment. For example the flow monitoring engine 116 reads current flow state information from the entry corresponding to the flow in the memory 130-1, and updates values of one or more fields (e.g., number of bytes, number of packets, time of last packet etc.) in the entry based on the received packet, in an embodiment.

In an embodiment, the memory 130-1 supports operations of i) identifying a flow in the memory 130-1 and ii) updating flow state information for the identified flow, based on ingressing packets corresponding to the flow, at wire speed. However, the memory 130-1 is limited to maintaining at most k flows, where k is a positive integer, in an embodiment. To account for a limitation on the number of flows that can be maintained in the memory 130-1, the network device 100 is configured to monitor a fullness level of the memory 130-1, and, when the fullness level of the memory 130-1 exceeds a threshold, transfer flow state information corresponding to one or more flows from the memory 130-1 to the memory 130-2, in an embodiment. For example, the embedded processor 122 is configured to monitor the fullness level of the memory 130-1, and, when the fullness level of the memory 130-1 exceeds a threshold, transfer flow state information corresponding to one or more flows from the memory 130-1 to the memory 130-2, in an embodiment. In an embodiment, the embedded processor 122 determines that the fullness level of the memory 130-1 exceeds the threshold when a number of available entries in a flow state information table for maintaining flow state information in the memory 130-1 is at zero or at almost zero (e.g., at 1, 2, 3, etc.), in an embodiment. In other embodiments, other suitable memory fullness criteria are utilized.

In an embodiment, in response to determining that the fullness level of the memory 130-1 exceeds the threshold, the embedded processor 122 identifies an oldest flow maintained in the memory 130-1 (i.e., a flow that was instantiated in the memory 130-1 before any other flow currently maintained in the memory 130-1), and transfers flow state information corresponding to the oldest flow from the memory 130-1 to the memory 130-2. In another embodiment, the embedded processor 122 utilizes a different selection criteria to identify a flow for which to transfer flow state information from the memory 130-1 to the memory 130-2.

In an embodiment, a program memory 124, coupled to the embedded processor 122, stores a set 126 of machine readable instructions that, when executed by the embedded processor 122, cause the embedded processor 122 to monitor a fullness level of the memory 130-1, and, when the fullness level of the memory 130-1 exceeds a threshold, i) identify a flow, in the memory 130-1, for which to transfer flow state information from the memory 130-1, ii) read the flow state information corresponding to the identified flow from the memory 130-1, and iii) store the flow state information in the memory 130-2. In an embodiment, storing the flow state information in the memory 130-2 includes determining whether a record corresponding to the flow already exists in the memory 130-2, for example if a record corresponding to the flow was created in the memory 130-2 when flow state information corresponding to the same flow was previously transferred from the memory 130-1. In response to determining that a record corresponding to the flow already exists in the memory 130-2, the embedded processor 122 updates the record in the memory 130-2 based on the flow state information currently being transferred from the memory 130-1. On the other hand, in response to determining that the memory 130-2 does not include a record corresponding to the flow, the embedded processor 122 creates a record corresponding to the flow in the memory 130-2, and stores the flow state information in the created record in the memory 130-2, in an embodiment.

After flow state information corresponding to a particular flow is transferred from the memory 130-1 to the memory 130-2, a new flow is instantiated in the freed up space in the memory 130-1, in an embodiment. For example, the flow monitoring engine 116, the embedded processor 122 or the CPU 138 instantiates the new flow in the memory 130-2 as described above, in an embodiment. The flow state update engine 120 of the flow monitoring engine 116 then begins updating the flow state information corresponding to the new flow based on new ingressing packets, corresponding to the flow received by the network device 100, at wire speed, in an embodiment.

The memory 130-2 is at the next level of hierarchy relative to the memory 130-1, and the memory 130-2 is configured to maintain a larger number of flows than the maximum number of flows that can be maintained in the memory 130-1, in an embodiment. However, the memory 130-2 is nonetheless limited to maintaining at most a certain number of flows that is larger than the maximum number of flows that can be maintained in the memory 130-1, in an embodiment. For example, whereas the memory 130-1 is limited to maintaining at most k flows, the memory 130-2 is limited to maintaining at most n*k, wherein n and k are positive integers, in an embodiment. To account for a limitation on the number of flows that can be maintained in the memory 130-2, the network device 100 is configured to monitor a fullness level of the memory 130-2 and, when the fullness level of the memory 130-2 exceeds a threshold, transfer flow state information corresponding to one or more flows from the memory 130-2 to the CPU 138. For example, the set of instructions 142, when executed by the embedded processor 122, further cause the embedded processor 142 to monitor the fullness level of the memory 130-2, and, when the fullness level of the memory 130-2 exceeds a threshold, transfer flow state information corresponding to one or more flows from the memory 130-2 to the CPU 138, in an embodiment. The CPU 138 is configured to receive flow state information transferred to the CPU 138 from memory 130-2, and to store the flow state information in the memory 130-3, in an embodiment.

In an embodiment, the embedded processor 122 determines that the fullness level of the memory 130-2 exceeds the threshold when a number of available entries in a flow state information table for maintaining flow state information in the memory 130-2 is at zero or at almost zero (e.g., at 1, 2, 3, etc.), in an embodiment. In other embodiments, other suitable memory fullness criteria are utilized. In an embodiment, in response to determining that the fullness level of the memory 130-2 exceeds the threshold, the embedded processor 122 identifies an oldest flow maintained in the memory 130-2 (i.e., a flow that was instantiated in the memory 130-2 before any other flow currently maintained in the memory 130-2), and transfers flow state information corresponding to the oldest flow from the memory 130-2 to the CPU 138. In another embodiment, the embedded processor 122 utilizes a different selection criteria to identify a flow for which to transfer flow state information from the memory 130-1 to the CPU 128. After flow state information corresponding to a particular flow is transferred from the memory 130-2 to the CPU 138, a record corresponding to a new flow is created in the freed up space in the memory 130-2 to store flow state information corresponding to the new flow transferred from the memory 130-1, in an embodiment.

In an embodiment, a program memory 142, coupled to the CPU 138, stores a set 144 of machine readable instructions that, when executed by the CPU 138, cause the CPU 138 to receive flow state information transferred from the memory 130-2, and to store the flow state information in the memory 130-3, in an embodiment. In an embodiment, storing the flow state information in the memory 130-3 includes determining whether a record corresponding to the flow already exists in the memory 130-3, for example if a record corresponding to the flow was created in the memory 130-3 when flow state information corresponding to the flow was previously transferred from the memory 130-2. In response to determining that a record corresponding to the flow already exists in the memory 130-3, the CPU 138 updates the record in the memory 130-3 based on the flow state information currently being transferred from the memory 130-3. On the other hand, in response to determining that the memory 130-2 does not include a record corresponding to the flow, the CPU 138 creates a record corresponding to the flow in the memory 130-3, and stores the flow state information in the created record in the memory 130-3.

The memory 130-3 is at a next level of hierarchy relative to the memory 130-2, and the memory 130-3 is configured to maintain a larger number of flows than the maximum number of flows that can be maintained in the memory 130-2, in an embodiment. For example, whereas the memory 130-2 is limited to maintaining at most n*k, the memory 130-3 is configured to maintain at most m*n*k flows, wherein m, n and k are positive integers, in an embodiment. The memory 130-3 is configured to maintain flow state information corresponding to a maximum number of flows for which flow monitoring is supported by the network device, in an embodiment. The CPU 138 is configured to periodically transfer flow state information from the memory 130-3 to an external flow monitoring entity, such as an external collector device, in an embodiment. For example, the program memory 142 stores a set 146 of machine readable instructions that, when executed by the CPU 138, cause the CPU 138 to periodically transfer flow state information from the memory 130-3 to an external flow monitoring entity, in an embodiment. In an embodiment, periodically transferring flow state information from the memory 130-3 to an external flow monitoring entity comprises transferring the flow state information from the memory 130-3 according to a predetermined schedule, such as a particular flow state transfer schedule supported by the external flow monitoring entity.

Figure 2:
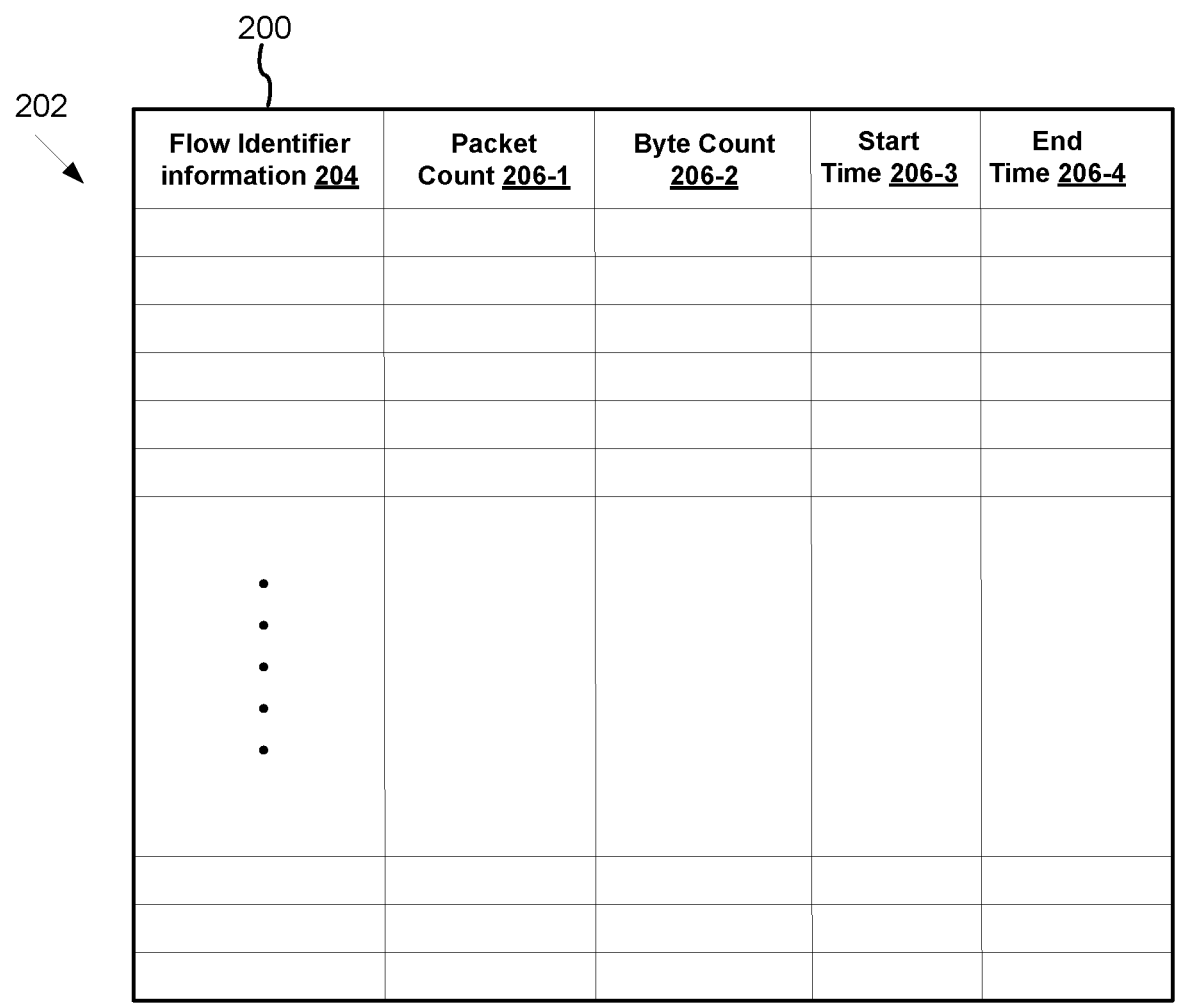
FIG. 2 is a diagram of an example flow state information table utilized for storing flow state information in the network device of FIG. 1, according to an embodiment.

FIG. 2 is a diagram of an example flow state information table 200 for storing flow state information, according to an embodiment. In an embodiment, each of the memories 130 of the network device 100 includes a flow state information table such as the flow state information table 200. The flow state information table 200 includes a plurality of entries 202 for storing flow state information corresponding to different flows. In an embodiment, the flow state information table 200 includes a number of entries that is limited by storage capacity of the memory that includes the flow state information table 200. For example, referring to FIGS. 1 and 2, a flow state information table, such as the flow state information table 200, included in the memory 130-1 includes at most k entries 202, a flow state information table, such as the flow state information table 200, included in the memory 130-2 includes at most n*k entries 202, and a flow state information table, such as the flow state information table 200, included in the memory 130-3 includes at most m*n*k entries 202, where m, n and k are positive integers, in an embodiment. Each entry 202 of the flow state information table 200 includes a flow identifier field 204 that associates the entry 202 with a particular flow, and a plurality of flow state fields 206 that store flow state information corresponding to the identified flow. The fields 206 include a byte count field 206-1 for recoding a count of bytes in received packets that belong to the identified flow, a packet count field 206-2 for recording a count of received packets that belong to the identified flow, a start time field 206-3 for recording a start time of the flow (e.g., a time at which a first packet that belongs to the flow was received by the network device), and a last packet time field 206-4 for recoding a time at which a most recent packet that belongs to the flow was received by the network device. In some embodiments, the flow state information table 200 omits ore of more flow state information fields 206 illustrated in FIG. 2 and/or included one or more flow state information fields 206 not illustrated in FIG. 2.

In an embodiment, instantiating, or creating a record for, a new flow in the flow state information table 200 includes recording identifying information associated with the new flow in the flow identifier information field 204 of an available entry 202 of the flow state information table 200, and recording current flow state information (e.g., based on a first ingressing packet of the flow being instantiated in the flow state information table 200, or based on flow state information being transferred to the flow state information table 200) in the flow state information fields 206 of the entry 202. In an embodiment, the flow state update engine 122 is configured to update flow state information based on an ingressing packet that belongs to an existing flow for which an entry already exists in the flow state information table 200 (e.g., stored in the memory 130-1) by i) searching the flow state information table 200 to identify an entry 202 in which a flow identifier information field 204 that identifies the flow, ii) reading current flow state information from one or more flow state information fields 206 of the identified entry 202, iii) calculating updated values of the one or more flow state information fields 206 based on the current flow state information read from the identified entry 202 and the ingressing packet that belongs to the flow, and iv) writing the updated values to the corresponding one or more flow state information fields. Similarly, the embedded processor 122/CPU 138 updates flow state information corresponding to a flow for which an entry already exists in the flow state information table 200 (e.g., stored in the memory 130-2/130-3) based on flow state information corresponding to the flow being transferred to the memory 130-2/130-2 by i) searching the flow state information table 200 to identify an entry 202 in which a flow identifier information field 204 that identifies the flow, ii) reading current flow state information from one or more flow state information fields 206 of the identified entry 202, iii) calculating updated values of the one or more flow state information fields 206 based on the current flow state information read from the identified entry 202 and the flow state information being transferred, and iv) writing the updated values to the corresponding one or more flow state information fields, in an embodiment.

Figure 3:
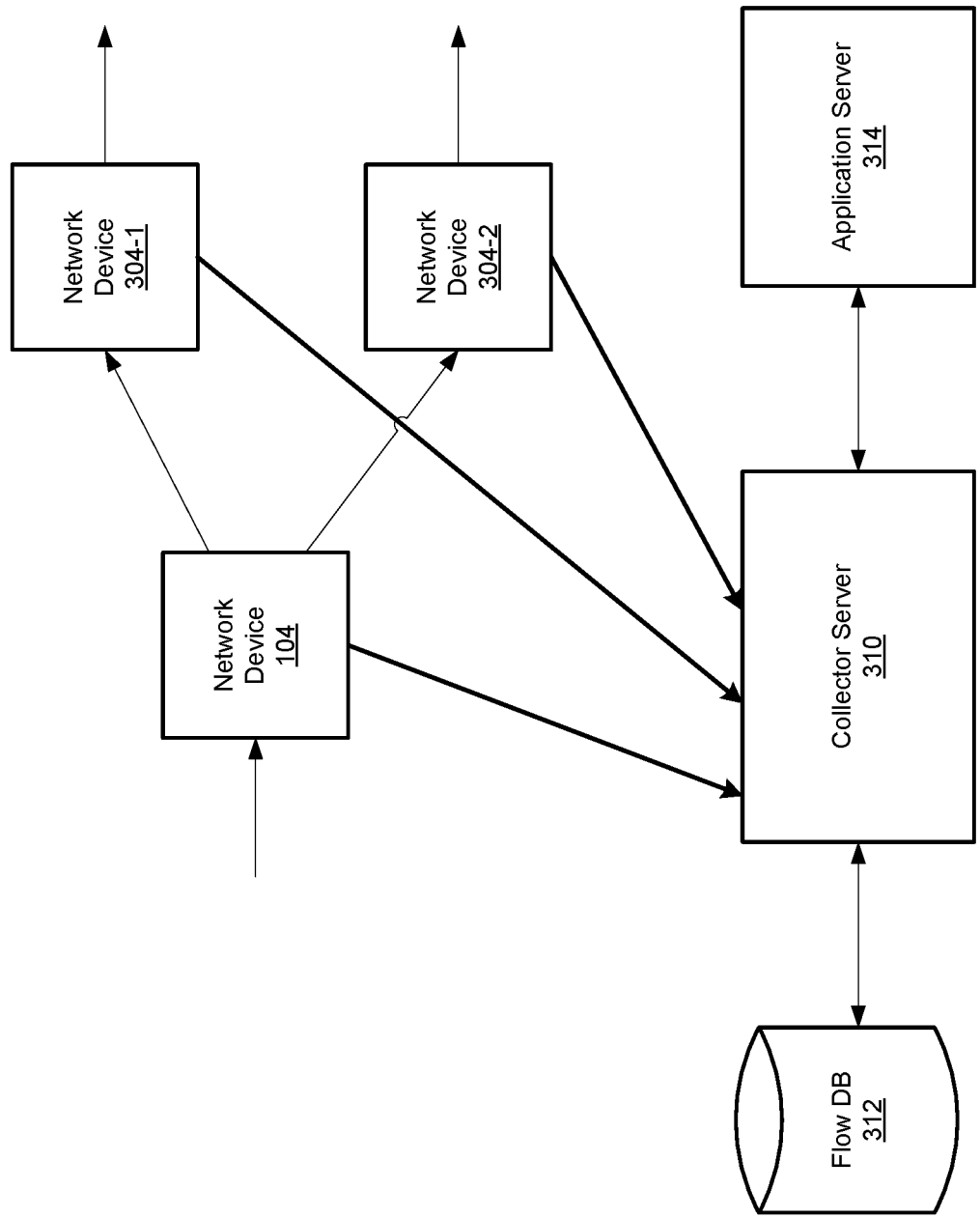
FIG. 3 is a block diagram of a flow monitoring system that includes the network device of FIG. 1, according to an embodiment.

FIG. 3 is a block diagram of a network 300 having flow monitoring capabilities, according to an embodiment. The network 300 includes a plurality of network devices 304, including at least a first network device 304-1, a second network device 304-2 and a third network device 304-3, in an embodiment. Each of the network devices 304 is the same as or similar to the network device 104 of FIG. 1, in an embodiment. In an embodiment, different ones of the network devices 304 are positioned at different locations or stages in the network 300, and process different numbers of flows during a given time interval depending on the locations or stages at which the network devices are portioned in the network 300. For example, in an embodiment in which the network 300 is an internal network (e.g., a campus network) that is connected to an external network (e.g., the Internet), the network device 304-1 is an edge network device such as an edge router that connects the network 300 to the other network, whereas the network device 302-2, 302-3 are non-edge network devices, such as non-edge switches or routers operating in the network 300. The network device 304-1 generally processes a greater number of flows as compared to the number of flows processed by the non-edge network device 302-2 or the non-edge network device 302-3, in this embodiment. As another example, in an embodiment in which the network devices 304 are arranged in a multi-stage architecture in the network 300, the network device 304-1 is a core network device in the network 300, whereas the network devices 304-2, 304-3 are leaf or spine network devices in the network 300. The network device 304-1 operating that the core of the network 300 generally processes a greater number of flows in a given time as compared to the network devices 304-2, 304-3 that operate at non-core stages of the network 300, in this embodiment.

The network devices 304 are configured to collect flow state information regarding flows that traverse the network devices 304 as described herein, and to export the flow state information to a collector device 310. In an embodiment, the network devices 304 are configured to export the flow state information to the collector device 301 over a network, according to a suitable protocols, such as IPFIX protocol or another suitable protocol. In an embodiment, the network devices 304 export the flow state information to the collector device 310 according to a predetermined schedule, such as periodically with predetermined time intervals. The collector device 310 stores the flow state information in a flow database 310 and/or provides the flow state information to an application server 314 for subsequent analyses by the application server 314, in an embodiment. The application server 314 utilizes flow state information received from the network devices 304 for various operations such as network planning, optimizing network resource utilization or traffic performance, detection of and defense against network attack/intrusion, quality of service (QoS) monitoring, usage-based accounting, etc. in various embodiments.

In an embodiment, each of the network devices 304 utilizes one or more hierarchical levels of memory as described herein to scale to the number of flows for which the network device 304 maintains flow state information at the network device 304, without expanding faster but more expensive, in terms of cost, power consumption, etc., memories at the lower levels of hierarchy. Thus, for example, by using the hierarchical memory architecture described herein, the network device 304-1 operating at an edge or at the core of the network scales up to monitoring a greater number of flows than the network device 304-2, although the network device 304-1 utilizes a same size hardware memory (e.g., TCAM) and a same size embedded memory as the network device 304-2, in an embodiment.

Figure 4:
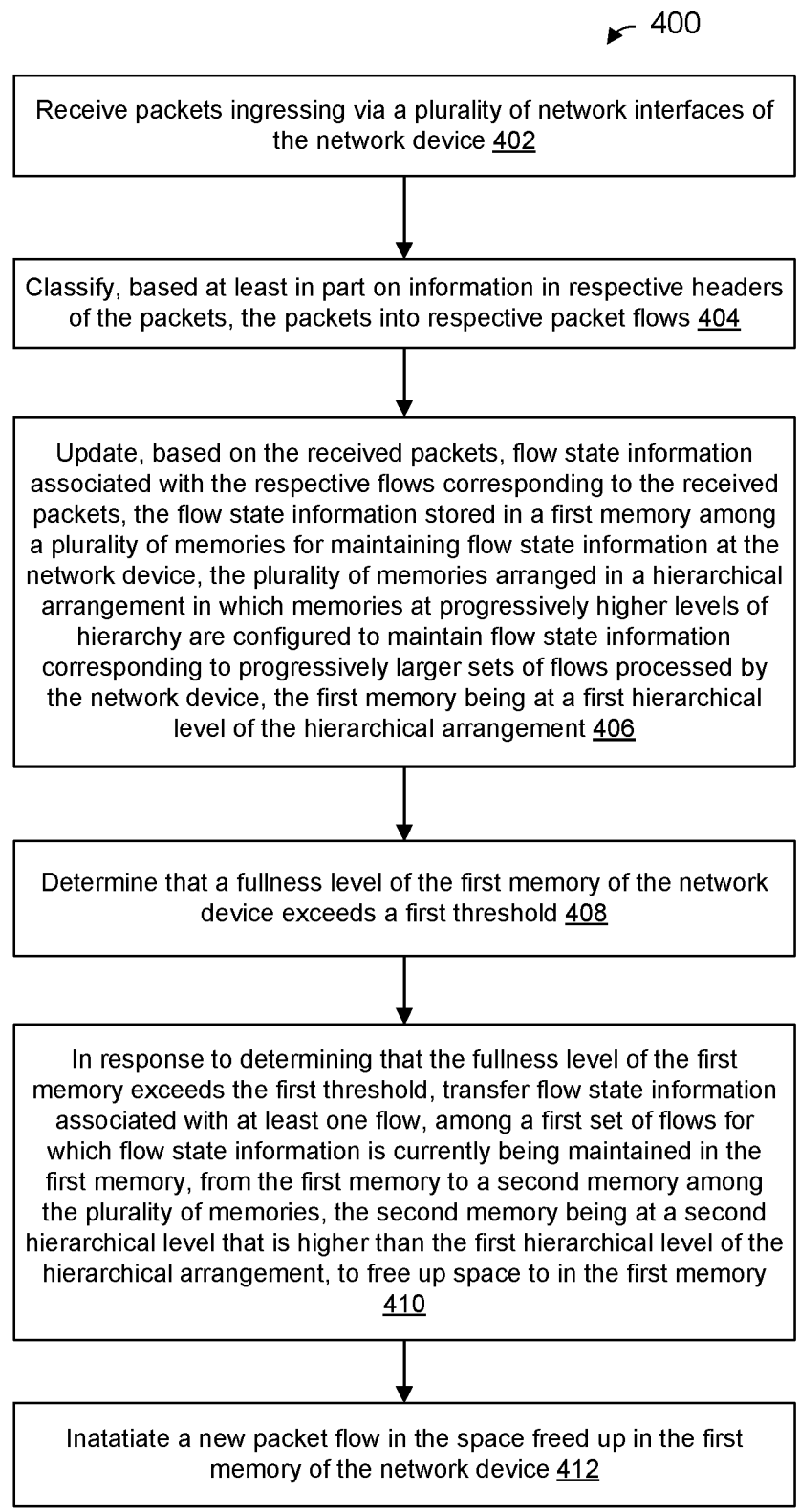
FIG. 4 is a flow diagram of an example method for monitoring flows in the network device of FIG. 1, according to another embodiment.

FIG. 4 is a flow diagram of an example method 400 implemented by a network device such as the network device 104 of FIG. 1, according to an embodiment. The method 400 is described with reference to the network device 100 (FIG. 1) merely for explanatory purposes. In other embodiments, the method 400 is implemented by a suitable network device different from the network device 104 of FIG. 1.

At block 402, packets ingressing via a plurality of network interfaces of the network device are received by a packet processor of the network device, and, at block 404, the received packets are classified by the packet processor into respective flows. In an embodiment, the packets are classified into the packet floes based at least in part on information in respective headers of the packets. As merely an example, in an embodiment, the packets are classified into flows defined as a streams of packets with headers all of which have same 5-tuple set of values, including i) a source IP address, ii) a source port number, iii) a destination IP address, iv) a destination port number and v) a particular IP protocol. In other embodiments, the packets are classified into flows according to other suitable classification criteria.

At block 406, flow state information associated with the respective flows corresponding to the received packets, is updated based on the received packets. In an embodiment, the flow state information is stored in a first memory among a plurality of memories for maintaining flow state information at the network device. In an embodiment, the flow state information stored in the memory 130-1. In another embodiment, the flow state information is stored in a suitable memory different from the memory 130-1. In an embodiment, the plurality of memories for maintaining flow state information at the network device are arranged in a hierarchical arrangement in which memories at progressively higher levels of hierarchy are configured to maintain flow state information corresponding to progressively larger sets of flows processed by the network device. The first memory is at a first hierarchical level of the hierarchical arrangement, in an embodiment. In an embodiment, the first memory has a highest access bandwidth among the plurality of memories. In an embodiment, the first memory supports update of flow state information at wire speed.

At block 408, it is determined that a fullness level of the first memory exceeds a first threshold. For example, it is determined that a number of available entries in a flow state information table for maintaining flow state information in the first memory is at zero or at almost zero (e.g., at 1, 2, 3, etc.), in an embodiment. In other embodiments, other suitable memory fullness criteria are utilized.

At block 410, in response to determining that the fullness level of the first memory exceeds the first threshold, flow state information associated with at least one flow, among a first set of flows for which flow state information is currently being maintained in the first memory, is transferred from the first memory to a second memory among the plurality of memories, to free up space to in the first memory. In an embodiment, the second memory is at a second hierarchical level of the hierarchical arrangement that is higher than the first hierarchical level of the hierarchical arrangement. In an embodiment, transferring flow state information associated with a flow from the first memory to the second memory includes identifying an oldest flow among the first set of flows, the oldest flow having been instantiated in the first memory before any other flow in the first set of flows for which flow state information is being currently maintained in the first memory, and transferring flow state information associated with the oldest flow identified in the first set of flows to the second memory. In an embodiment, the second memory has a memory access bandwidth that is lower than the memory access bandwidth of the first memory. In an embodiment, the second memory does not support update of flow state information at wire speed. In an embodiment, transferring flow state information associated with the oldest flows from the first memory to the second memory ensures that flow state information for the newest and most active flows being processed by the network device at any given time is maintained in the first, faster, memory of the network device, while scaling up the overall number of flows being monitored by the network device.

At block 412, after transferring flow state information associated with the at least one flow from the first memory to the second memory, a new flow is instantiated in the space freed up in the first memory. Flow state information corresponding to the new flow is then updated, at wire speed, based on subsequent packets corresponding to the flow received by the network device.

In an embodiment, a method for monitoring flows in a network device includes: receiving, at a packet processor of the network device, packets ingressing via a plurality of network interfaces of the network device; classifying, with the packet processor based at least in part on information in respective headers of the packets, the packets into respective flows; updating, with the packet processor based on the received packets, flow state information associated with the respective flows corresponding to the received packets, the flow state information stored in a first memory among a plurality of memories for maintaining flow state information at the network device, the plurality of memories arranged in a hierarchical arrangement in which memories at progressively higher levels of hierarchy are configured to maintain flow state information corresponding to progressively larger sets of flows processed by the network device, the first memory being at a first hierarchical level of the hierarchical arrangement; and dynamically managing, with the packet processor, the plurality of memories, including: determining, with the packet processor, that a fullness level of the first memory exceeds a first threshold, in response to determining that the fullness level of the first memory exceeds the first threshold, transferring flow state information associated with at least one flow, among a first set of flows for which flow state information is currently being maintained in the first memory, from the first memory to a second memory among the plurality of memories, the second memory being at a second hierarchical level that is higher than the first hierarchical level of the hierarchical arrangement, to free up space to in the first memory, and after transferring flow state information associated with the at least one flow from the first memory to the second memory, instantiating, with the packet processor, a new flow in the space freed up in the first memory.

In other embodiments, the method also includes one of, or any suitable combination of two or more of, the following features.

The first memory has a first access bandwidth, and transferring flow state information associated with the at least one flow from the first memory to the second memory comprises transferring the flow state information to the second memory having a second memory access bandwidth, the second memory access bandwidth being lower than the first memory access bandwidth.

Updating, based on a received packet, flow state information associated with a flow corresponding to the packet, includes searching a ternary content addressable memory (TCAM) to identify an entry corresponding to the flow, and updating, based on the received packet, one or more fields of the entry corresponding to the flow.

Transferring flow state information associated with at least one flow comprises transferring the flow state information associated with the at least one flow to a random-access memory (RAM).

Transferring flow state information associated with the at least one flow from the first memory to the second memory includes: identifying an oldest flow among the first set of flows, the oldest flow having been instantiated in the first memory before any other flow in the first set of flows for which flow state information is being currently maintained in the first memory, and transferring flow state information associated with the oldest flow identified in the first set of flows to the second memory.

Dynamically managing the plurality of memories further includes: determining, with the packet processor, that a fullness level of the second memory exceeds a second threshold, in response to determining that the fullness level of the second memory exceeds the second threshold, transferring flow state information associated with at least one flow, among a second set of flows for which flow state information is currently being maintained in the second memory, from the second memory to a third memory among the plurality of memories, the third memory being at a third hierarchical level that is higher than the second hierarchical level of the hierarchical arrangement, to free up space to in the second memory, and after transferring flow state information associated with the at least one flow from the second memory to the third memory, creating, in the freed up space in the second memory, a record for storing flow state information associated with a new transferred flow from the first memory to the second memory.

Transferring flow state information associated with the at least one flow from the second memory to the third memory comprises transferring the flow state information associated with the at least one flow to a memory external to the packet processor.

Transferring flow state information associated with the at least one flow from the second memory to the third memory comprises transferring the flow state information associated with the at least one flow to a memory coupled to a central processing unit (CPU) of the network device.

Transferring flow state information associated with the at least one flow from the second memory to the third memory includes: identifying an oldest flow among the second set of flows, the oldest flow having been instantiated in the second memory before any other flow in the second set of flows for which flow state information is being currently maintained in the second memory, and transferring flow state information associated with the oldest flow identified in the second set of flows to the third memory.

The method further comprises periodically exporting flow state information from the third memory to a collector device that is external to the network device, and after exporting flow state information from the third memory to the collector device, make memory space that was occupied by the flow state information in the third memory available for storing new flow state information subsequently transferred from the second memory to the third memory.

In another embodiment, a network device comprises a plurality of network interfaces, and a packet processor coupled to the plurality of network interfaces. The packet processor is configured to: receive packets ingressing via a plurality of network interfaces of the network device, classify, based at least in part on information in respective headers of received packets, the packets into respective flows, update, based on the received packets, flow state information associated with the respective flows corresponding to the received packets, the flow state information stored in a first memory among a plurality of memories for maintaining flow state information at the network device, the plurality of memories arranged in a hierarchical arrangement in which memories at progressively higher levels of hierarchy are configured to maintain flow state information corresponding to progressively larger sets of flows processed by the network device, the first memory being at a first hierarchical level of the hierarchical arrangement, and dynamically mange the plurality of memories, the packet processor being configured to: determine a fullness level of the first memory exceeds a first threshold, in response to determining that the fullness level of the first memory exceeds the first threshold, transfer flow state information associated with at least one flow, among a first set of flows for which flow state information is currently being maintained in the first memory, from the first memory to a second memory among the plurality of memories, the second memory being at a second hierarchical level that is higher than the first hierarchical level of the hierarchical arrangement, to free up space to in the first memory, and after transferring flow state information associated with the at least one flow from the first memory to the second memory, instantiate a new flow in the space freed up in the first memory.

In other embodiments, the network device also comprises one of, or any suitable combination of two or more of, the following features.

The first memory has a first access bandwidth.

The second memory has a second memory access bandwidth, the second memory access bandwidth being lower than the first memory access bandwidth.

The first memory comprises a ternary content addressable memory (TCAM) that associates flow state information with corresponding flows.

The second memory comprises a random-access memory (RAM) that associates flow state information with corresponding flows.

The packet processor is configured to update, based on a received packet, flow state information associated with a flow corresponding to the packet, at least by searching the TCAM to identify an entry corresponding to the flow, and updating, based on the received packet, one or more fields of the entry corresponding to the flow.

The packet processor is configured to identify an oldest flow, among the first set of flows for which flow state information is being currently maintained in the first memory, the oldest flow having been instantiated in the first memory before any other flow in the first set of flows, and transfer flow state information associated with the oldest flow from the first memory to the second memory.

The packet processor is further configured to: determine that a fullness level of the second memory exceeds a second threshold, in response to determining that the fullness level of the second memory exceeds the second threshold, transfer flow state information associated with at least one flow, among a second set of flow for which flow state information is currently being maintained in the second memory, from the second memory to a third memory among the plurality of memories, the third memory being at a third hierarchical level of the hierarchical arrangement, to free up space to in the second memory, and after transferring flow state information associated with the at least one flow from the second memory to the third memory, create, in the freed up space in the second memory, a record for storing flow state information associated with a flow that is subsequently transferred from the first memory to the second memory.

The packet processor is configured to identify an oldest flow among the second set of flows for which flow state information is being currently maintained in the second memory, the oldest flow having been instantiated in the second memory before any other flow in the second set of flows, and transfer flow state information associated with the oldest flow from the second memory to the third memory.

The third memory is external to the packet processor.

The network device further comprises an external processor, wherein the third memory is included in a database coupled to the external processor.

The external processor is configured to periodically export flow state information stored in the third memory to a collector device, and after exporting flow state information from the third memory to the collector device, make memory space that was occupied by the flow state information in the third memory available for storing new flow state information subsequently transferred from the second memory to the third memory.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for monitoring flows in a network device, the method comprising:
    receiving, at a packet processor of the network device, packets ingressing via a plurality of network interfaces of the network device;
    classifying, with the packet processor based at least in part on information in respective headers of the packets, the packets into respective flows;
    updating, with the packet processor based on the received packets, flow state information associated with the respective flows corresponding to the received packets, the flow state information stored in a first memory among a plurality of memories for maintaining flow state information at the network device, the plurality of memories arranged in a hierarchical arrangement in which memories at progressively higher levels of hierarchy are configured to maintain flow state information corresponding to progressively larger sets of flows processed by the network device, the first memory being at a first hierarchical level of the hierarchical arrangement; and
    dynamically managing, with the packet processor, the plurality of memories, including:
        determining, with the packet processor, that a fullness level of the first memory exceeds a first threshold,
        in response to determining that the fullness level of the first memory exceeds the first threshold, transferring flow state information associated with at least one flow, among a first set of flows for which flow state information is currently being maintained in the first memory, from the first memory to a second memory among the plurality of memories, the second memory being at a second hierarchical level that is higher than the first hierarchical level of the hierarchical arrangement, to free up space to in the first memory, and
        after transferring flow state information associated with the at least one flow from the first memory to the second memory, instantiating, with the packet processor, a new flow in the space freed up in the first memory.

2. The method of claim 1, wherein:
    the first memory has a first access bandwidth, and
    transferring flow state information associated with the at least one flow from the first memory to the second memory comprises transferring the flow state information to the second memory having a second memory access bandwidth, the second memory access bandwidth being lower than the first memory access bandwidth.

3. The method of claim 1, wherein updating, based on a received packet, flow state information associated with a flow corresponding to the packet, includes:
    searching a ternary content addressable memory (TCAM) to identify an entry corresponding to the flow, and
    updating, based on the received packet, one or more fields of the entry corresponding to the flow.

4. The method of claim 3, wherein transferring flow state information associated with at least one flow comprises transferring the flow state information associated with the at least one flow to a random-access memory (RAM).

5. The method of claim 1, wherein transferring flow state information associated with the at least one flow from the first memory to the second memory includes:
    identifying an oldest flow among the first set of flows, the oldest flow having been instantiated in the first memory before any other flow in the first set of flows for which flow state information is being currently maintained in the first memory, and transferring flow state information associated with the oldest flow identified in the first set of flows to the second memory.

6. The method of claim 1, wherein dynamically managing the plurality of memories further includes:
   determining, with the packet processor, that a fullness level of the second memory exceeds a second threshold,
   in response to determining that the fullness level of the second memory exceeds the second threshold, transferring flow state information associated with at least one flow, among a second set of flows for which flow state information is currently being maintained in the second memory, from the second memory to a third memory among the plurality of memories, the third memory being at a third hierarchical level that is higher than the second hierarchical level of the hierarchical arrangement, to free up space to in the second memory, and
   after transferring flow state information associated with the at least one flow from the second memory to the third memory, creating, in the freed up space in the second memory, a record for storing flow state information associated with a new transferred flow from the first memory to the second memory.

7. The method of claim 6, wherein transferring flow state information associated with the at least one flow from the second memory to the third memory comprises transferring the flow state information associated with the at least one flow to a memory external to the packet processor.

8. The method of claim 6, wherein transferring flow state information associated with the at least one flow from the second memory to the third memory comprises transferring the flow state information associated with the at least one flow to a memory coupled to a central processing unit (CPU) of the network device.

9. The method of claim 6, wherein transferring flow state information associated with the at least one flow from the second memory to the third memory includes:
   identifying an oldest flow among the second set of flows, the oldest flow having been instantiated in the second memory before any other flow in the second set of flows for which flow state information is being currently maintained in the second memory, and
   transferring flow state information associated with the oldest flow identified in the second set of flows to the third memory.

10. The method of claim 1, further comprising:
    periodically exporting flow state information from the third memory to a collector device that is external to the network device, and
    after exporting flow state information from the third memory to the collector device, make memory space that was occupied by the flow state information in the third memory available for storing new flow state information subsequently transferred from the second memory to the third memory.

11. A network device, comprising:
    a plurality of network interfaces, and
    a packet processor coupled to the plurality of network interfaces, wherein the packet processor is configured to:
    receive packets ingressing via a plurality of network interfaces of the network device,
    classify, based at least in part on information in respective headers of received packets, the packets into respective flows,
    update, based on the received packets, flow state information associated with the respective flows corresponding to the received packets, the flow state information stored in a first memory among a plurality of memories for maintaining flow state information at the network device, the plurality of memories arranged in a hierarchical arrangement in which memories at progressively higher levels of hierarchy are configured to maintain flow state information corresponding to progressively larger sets of flows processed by the network device, the first memory being at a first hierarchical level of the hierarchical arrangement, and
    dynamically mange the plurality of memories, the packet processor being configured to:
    determine a fullness level of the first memory exceeds a first threshold;
    in response to determining that the fullness level of the first memory exceeds the first threshold, transfer flow state information associated with at least one flow, among a first set of flows for which flow state information is currently being maintained in the first memory, from the first memory to a second memory among the plurality of memories, the second memory being at a second hierarchical level that is higher than the first hierarchical level of the hierarchical arrangement, to free up space to in the first memory, and
    after transferring flow state information associated with the at least one flow from the first memory to the second memory, instantiate a new flow in the space freed up in the first memory.

12. The network device of claim 11, wherein:
    the first memory has a first access bandwidth, and
    the second memory has a second memory access bandwidth, the second memory access bandwidth being lower than the first memory access bandwidth.

13. The network device of claim 11, wherein: the first memory comprises a ternary content addressable memory (TCAM) that associates flow state information with corresponding flows, and the second memory comprises a random-access memory (RAM) that associates flow state information with corresponding flows.

14. The network device of claim 13, wherein the packet processor is configured to update, based on a received packet, flow state information associated with a flow corresponding to the packet, at least by:
    searching the TCAM to identify an entry corresponding to the flow, and
    updating, based on the received packet, one or more fields of the entry corresponding to the flow.

15. The network device of claim 11, wherein the packet processor is configured to:
    identify an oldest flow, among the first set of flows for which flow state information is being currently maintained in the first memory, the oldest flow having been instantiated in the first memory before any other flow in the first set of flows, and
    transfer flow state information associated with the oldest flow from the first memory to the second memory.

16. The network device of claim 13, wherein the packet processor is further configured to:
    determine that a fullness level of the second memory exceeds a second threshold,
    in response to determining that the fullness level of the second memory exceeds the second threshold, transfer flow state information associated with at least one flow, among a second set of flow for which flow state information is currently being maintained in the second memory, from the second memory to a third memory among the plurality of memories, the third memory being at a third hierarchical level of the hierarchical arrangement, to free up space to in the second memory, and after transferring flow state information associated with the at least one flow from the second memory to the third memory, create, in the freed up space in the second memory, a record for storing flow state information associated with a flow that is subsequently transferred from the first memory to the second memory.

17. The network device 16, wherein the packet processor is configured to:
identify an oldest flow among the second set of flows for which flow state information is being currently maintained in the second memory, the oldest flow having been instantiated in the second memory before any other flow in the second set of flows, and transfer flow state information associated with the oldest flow from the second memory to the third memory.

18. The network device of claim 16, wherein the third memory is external to the packet processor.

19. The network device of claim 17, further comprising an external processor, wherein the third memory is included in a database coupled to the external processor.

20. The network device of claim 19, wherein the external processor is configured to:
periodically export flow state information stored in the third memory to a collector device, and after exporting flow state information from the third memory to the collector device, make memory space that was occupied by the flow state information in the third memory available for storing new flow state information subsequently transferred from the second memory to the third memory.

* * * * *